No. 786,290. PATENTED APR. 4, 1905.
W. HOSSE & R. McEWEN.
ROUNDABOUT.
APPLICATION FILED NOV. 23, 1903.

3 SHEETS—SHEET 3.

Witnesses
F. L. Ourand
Wm. H. Ourand

Inventors
William Hosse and
Robert McEwen
by John A. Saul
Attorney

No. 786,290.

Patented April 4, 1905.

UNITED STATES PATENT OFFICE.

WILLIAM HOSSE AND ROBERT McEWEN, OF NASHVILLE, TENNESSEE.

ROUNDABOUT.

SPECIFICATION forming part of Letters Patent No. 786,290, dated April 4, 1905.

Application filed November 23, 1903. Serial No. 182,379.

*To all whom it may concern:*

Be it known that we, WILLIAM HOSSE and ROBERT McEWEN, citizens of the United States, residing at Nashville, in the county of Davidson and State of Tennessee, have invented certain new and useful Improvements in Roundabouts, of which the following is a specification.

Our invention relates to roundabouts or merry-go-rounds in which a series of rotatable platforms carrying various devices or figures are supported from a main spindle or shaft and operated from any suitable source of power.

The objects of the device are to so construct it that it may be easily and cheaply manufactured, can be readily assembled, and will require but a small amount of power for its operation.

Figure 1:
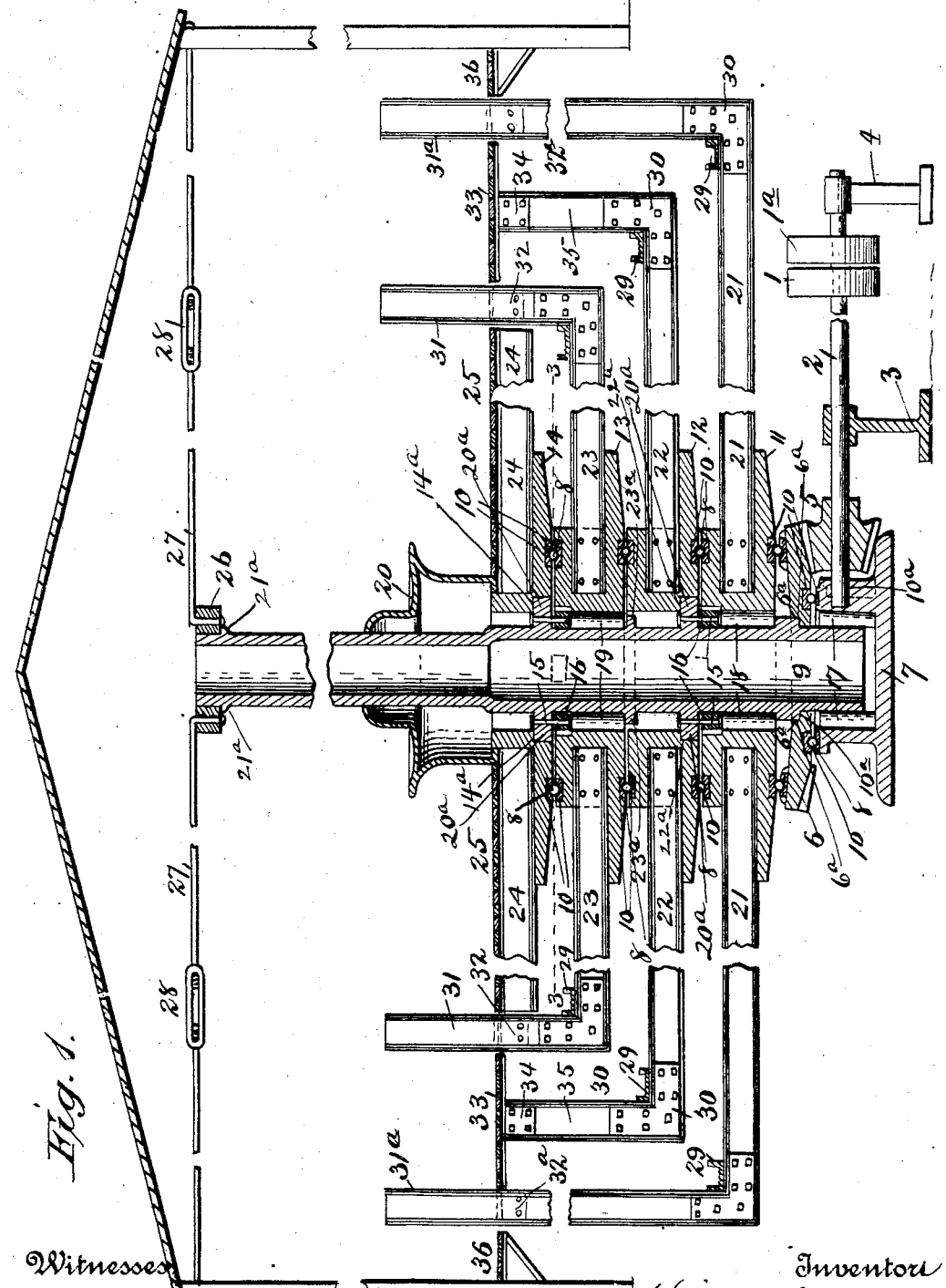
Figure 2:
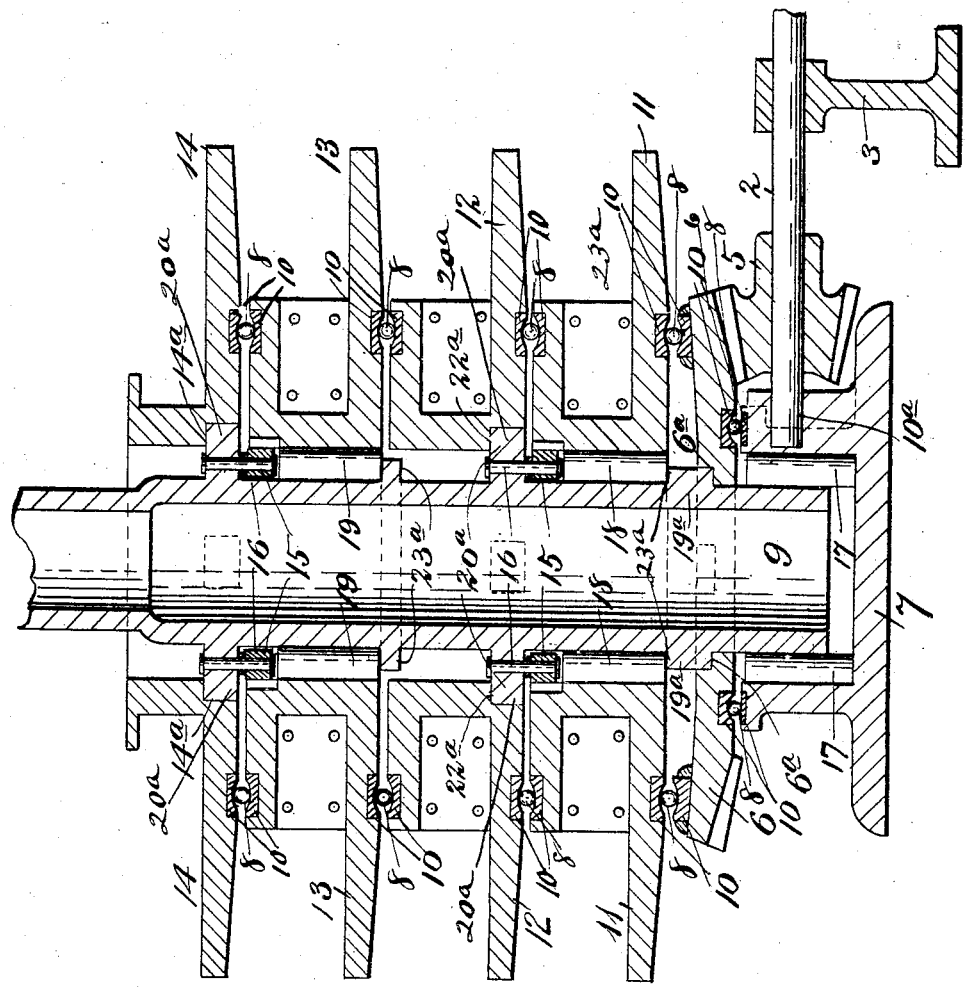
Figure 3:
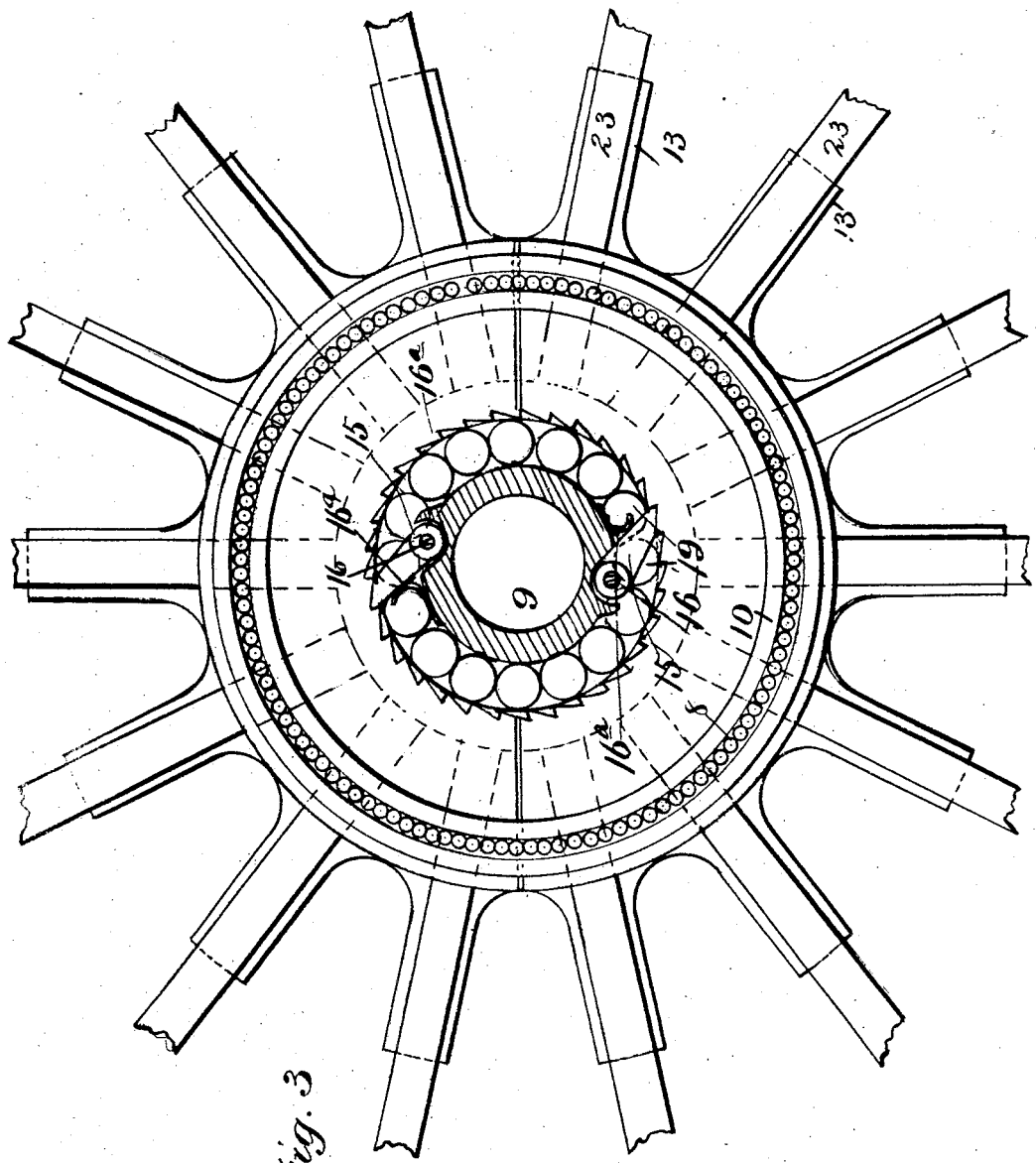

In the drawings forming a part of this specification, and in which like symbols of reference represent corresponding parts in the several views, Figure 1 is a vertical sectional view of the device; Fig. 2, a vertical section of the shaft and spiders connected to the same, and Fig. 3 a sectional plan view.

1 and 1$^a$ represent tight and loose pulleys on shaft 2 for driving the device; 3 and 4, pedestals in which shaft 2 is journaled; 5, a bevel-pinion keyed to shaft 2; 6, a gear meshing with pinion 5, said gear being cast or formed with four pockets 6$^a$ to receive a shaft 9 and lugs formed on the same.

7 is a main bed-plate turned inside for rollers 17, turned on top for steel plate 10, and beveled out or recessed at 10$^a$, so as to form a bearing for shaft 2 to run in. We have also designated the other plates by the numeral 10.

8 represents steel balls to reduce the friction of the parts, the same running on steel plates 10.

9 is the main shaft turned for rollers 17 18 19 and cast or formed with four lugs 19$^a$ to rest in pockets or recesses 6$^a$ in gear 6. The shaft 9 also has four lugs 20$^a$ for spiders 12 and 14, said lugs supporting spiders 12 and 14 and acting as a key to lock the spiders to the shaft.

26 is a band supported upon lugs 21$^a$, formed on top of shaft 9.

11 and 13 are cast-iron spiders cast in one piece, turned inside for rollers 18 and 19, and turned on top and bottom for steel plates 10. The spiders are then split, so as to go around shaft 9 and be bolted together by eight bolts. Spider 11 is shown constructed to receive fourteen beams for outside horses and spider 13 constructed to receive fourteen beams for inside horses and having also ratchet-teeth cast with the said spiders.

12 is a cast-iron spider cast with four pockets 22$^a$ to rest on shaft 9 to act as key for same, turned on top and bottom for steel plates 10, and then split and placed around shaft 9 and bolted together. This spider is shown constructed to receive fourteen beams for revolving floor 33.

14 is a cast-iron spider cast in one piece and not split, as the same is unnecessary, with four pockets 14$^a$ to rest on shaft 9 and act as key for same. This spider usually receives twelve beams 24 for revolving floor 25 and seat 20.

15 represents steel dogs to work in ratchet-teeth in spiders 11 and 13 and bolted to shaft 9 by bolts 16. These dogs are held in engagement with the ratchet-teeth by springs 16$^a$. Rollers 17, 18, and 19 run between shaft 9 and bed-plate 7 and spiders 11 and 13. Rollers 18 and 19 rest on collars 23$^a$, formed on shaft 9.

20 is a seat around shaft 9, the same formed of any preferred design, or it may be, if desired, a music-box.

21, 22, and 23 are I-beams to be bolted or clamped to spiders 11, 12, and 13.

25 is a wooden floor laid on beams 24.

26 is a cast-iron band to fit shaft 9, with four holes to receive brace-rods 27, and 28 are turnbuckles to adjust and steady shaft 9.

29 represents steel channel-irons bolted to beams 21, 22, and 23 to separate and steady beams that support horses; 30, iron angle-plates, one on either side, to bolt beams 21 22 to 35 and 23 to 31; 31, steel I-beams at right angles to beams 23 for inside horses, and 21 at right angles to 31$^a$ for outside horses; 32, steel channel-irons bent to fill up opening between beams 31, and 32$^a$ channel-irons for beams 31$^a$.

33 is a wooden floor laid on cast-iron angle-plates 34, said angle-plates 34 being bolted to beams 35.

36 is a wooden floor around outside horses.

The operation of the device will be apparent from the foregoing. Power being applied from any source to pulley 1, the shaft 2 is rotated and with it the shaft 9 and the frame of the device carried thereby. The engagement of the pawls in the ratchets of the spiders 11 and 13 carries said members around and with them the other parts sustained by shaft 9. When the loose pulley has received the band, power is of course cut off from the device and the pawls working in the ratchets permit a gradual stoppage of the machine, thus preventing any jarring of the parts.

Having now fully described our invention, what we claim as new, and desire to secure by Letters Patent, is—

1. In a roundabout, a main shaft, platforms driven thereby, a supporting-base, a gear-wheel revolubly mounted on the base, pockets in said gear-wheel, lugs on the shaft received in said pockets, a pinion meshing with the gear-wheel, and means for imparting motion to the pinion to operate the shaft.

2. In a roundabout, a main shaft, detachable spiders connected to the same, interlocking means between the spiders and the shaft, each spider being revoluble independently of the adjoining spider, beams carried by the spiders, and means for connecting the beams to the spiders.

3. In a device of the character described, a main shaft, separable spiders, means for locking some of said spiders to the shaft, means for revolubly connecting the other of said spiders to the shaft, a gear-wheel connected with the base of said shaft, a main base supporting the gear-wheel, and means for driving the gear-wheel.

4. In a device of the character described, a main shaft, a gear-wheel connected to the base of the same, a bed-plate supporting the gear-wheel, means for driving said gear-wheel, spiders detachably connected to the main shaft, flanges formed on the main shaft, rollers located between the main shaft and spiders and adapted to ride upon said flanges, and a pawl-and-ratchet mechanism between the main shaft and spiders.

5. In a roundabout, a main shaft, a gear-wheel connected to the base of the same, a bed-plate supporting the gear-wheel, a horizontal shaft journaled in the bed-plate, a pinion on the horizontal shaft engaging the gear-wheel of the main shaft, separable spiders, flanges on the main shaft receiving and locking some of the spiders thereto, ratchet mechanism between the shaft and other of said spiders, roller-supporting flanges also on the main shaft, and rollers on said flanges.

6. In a roundabout, a main shaft, a gear-wheel connected to the same, a bed-plate supporting the gear-wheel, a horizontal shaft carrying a pinion in mesh with said gear, spiders detachably connected to the main shaft, supporting-beams detachably connected to the spiders, some of said beams adapted to carry figures and others platforms, rollers on said flanges, ratchets on the figure-carrying spiders, pawls upon the main shaft to engage the ratchets of the spiders, tracks formed between the various spiders, and antifriction-balls on said tracks.

In testimony whereof we affix our signatures in presence of two witnesses.

WILLIAM HOSSE.
ROBERT McEWEN.

Witnesses:
MURRAY CURRAN,
JAMES A. RYAN.